A. W. PAGETT, OF SPRINGFIELD, OHIO.

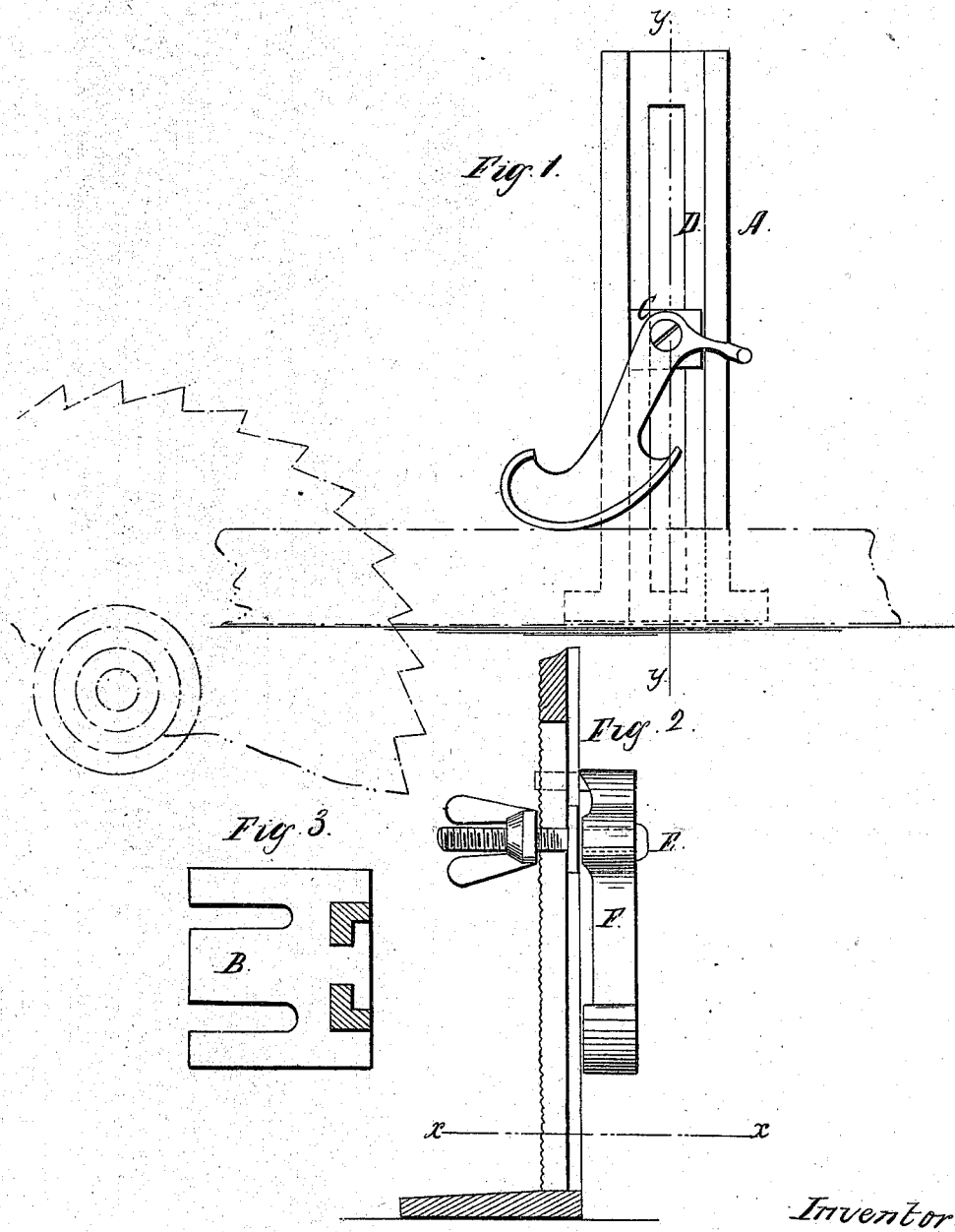

Letters Patent No. 87,700, dated March 9, 1869.

IMPROVED SAWING-MACHINE GUARD.

The Schedule referred to in these Letters Patent and making part of the same.

*To all whom it may concern:*

Be it known that I, A. W. PAGETT, of Springfield, in the county of Clark, and State of Ohio, have invented a new and improved Sawing-Machine Guard; and I do hereby declare that the following is a full, clear, and exact description thereof, which will enable others skilled in the art to make and use the same, reference being had to the accompanying drawings, forming part of this specification.

The object of this invention is to provide a self-acting guard to be used on circular-sawing machines, to prevent the strips being thrown upward or forward by the saw, after being cut off, or about the time of being finally severed from the cant, as sometimes occurs.

It consists of an eccentric dog or cam, suspended from a post, so as to bear upon the upper face of the portion of the board which forms the strip being cut off, in such a manner as to allow the cant or plank to move freely in the direction to be sawed, but which will instantly clamp it down tightly to the table, if started into motion in the opposite direction, or in an upward direction.

Figure 1 represents a side elevation of my improved guard;

Figure 2 represents a sectional elevation, taken on the line $y\ y$ of fig. 1; and Figure 3 represents a horizontal section of the post, on the line $x\ x$ of fig. 2.

Similar letters of reference indicate like parts.

A represents a post, preferably made of metal, and arranged to rest, by its foot B, on the table, and be adjustably connected thereto, in any suitable manner.

C represents a block, arranged to slide vertically on the said post, either on ways, or in a recess, D, or it may be made sufficiently large to have a mortise, through which the post may pass, and to slide thereon. It is provided with a set-screw, D, and thumb-nut, for clamping it at any desired position on the said post, and supports a pivot, E, on which the eccentric dog F is suspended, as represented in the drawings, and which may be adjusted to the right position for lumber of different thickness. The eccentric face of the dog or cam may be roughened, so as to adhere to the surface of the lumber; and, if preferred, a coiled or other spring may be attached to the dog and the block C, in a manner to cause the dog to bear on the article being sawed with a force due to the tension of the spring.

In some cases, it may be found preferable to employ two of my improved guards, one arranged slightly in advance of the saw, and the other in rear of the cutting-edge, and when only one is used, it may be found most advantageous to place it in rear of the cutting-edge, but it will be observed that they may be adjusted to any desired position.

Having thus described my invention,

I claim as new, and desire to secure by Letters Patent—

The combination, with the post A, arranged to be adjustably attached to a table, of the adjustable slide C and dog F, substantially as and for the purpose described.

A. W. PAGETT.

Witnesses:
W. F. PAGETT,
NED. PAGETT.